United States Patent
Ivershen et al.

(10) Patent No.: US 10,104,561 B2
(45) Date of Patent: Oct. 16, 2018

(54) SIGNALING MESSAGE CORRELATION IN LTE ACCESS AND CORE NETWORKS

(71) Applicant: Tektronix, Inc., Beaverton, OR (US)

(72) Inventors: Aleksey G. Ivershen, Garland, TX (US); Vignesh Janakiraman, Plano, TX (US); Ge Zhang, Dallas, TX (US); Baoyuan Wang, Dallas, TX (US)

(73) Assignee: NETSCOUT SYSTEMS TEXAS, LLC, Westford, MA (US)

( * ) Notice: Subject to any disclaimer, the term of this patent is extended or adjusted under 35 U.S.C. 154(b) by 332 days.

(21) Appl. No.: 14/064,982

(22) Filed: Oct. 28, 2013

(65) Prior Publication Data

US 2015/0003256 A1     Jan. 1, 2015

Related U.S. Application Data

(60) Provisional application No. 61/840,667, filed on Jun. 28, 2013.

(51) Int. Cl.
*H04L 12/26* (2006.01)
*H04W 24/08* (2009.01)
*H04W 92/20* (2009.01)

(52) U.S. Cl.
CPC ............ *H04W 24/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 8,620,302 B2* | 12/2013 | Gunnarsson et al. | ........ 455/423 |
| 2012/0127934 A1* | 5/2012 | Anderson | ......... H04W 72/0406 370/329 |
| 2013/0150037 A1* | 6/2013 | Jha | .................... H04W 36/0005 455/435.1 |
| 2014/0219248 A1* | 8/2014 | Reddiboyana | ........ H04W 36/14 370/331 |
| 2016/0057663 A1* | 2/2016 | Teyeb | ............... H04W 36/0027 455/436 |

\* cited by examiner

*Primary Examiner* — Willie J Daniel, Jr.
(74) *Attorney, Agent, or Firm* — Locke Lord LLP; Scott D. Wofsy; Christopher J. Capelli

(57) ABSTRACT

A computer implemented method and telecommunications diagnostic apparatus that correlates packets on a core network with those on the access network. Generated is an identification attribute from Information Elements (IEs) in S1AP packets present in the core network and accessible to the access network. The generated identification attribute is integrated to an access and core session of the access and core network to correlate data packets between the access and core session by comparing if a core session contains the same identification attribute as that of an access session within the life span of the access session.

5 Claims, 3 Drawing Sheets

SIGNALING MESSAGE CORRELATION IN LTE ACCESS AND CORE NETWORKS

CROSS REFERENCE TO RELATED APPLICATIONS

This application claims priority to U.S. Patent Application Ser. No. 61/840,667 filed Jun. 28, 2013 which is incorporated herein by reference in its entirety.

FIELD OF THE INVENTION

The invention relates to network diagnostics in a cellular mobile packet data network.

BACKGROUND OF THE INVENTION

Troubleshooting on cellular mobile data networks such as Long Term Evolution (LTE) gets more and more important as the number of subscribers starts to pick up, the traffic on these networks increases and subscribers start to use more and more different applications and services. There is a demand for diagnostic solutions, which makes it easy to discover what and where the problem is in the network.

In particular, the telecommunication network environment is rapidly moving toward increasingly complexity, involving multiple technologies, multiple protocols, and interconnections to a wide variety of networks. More complex network environment means that the potential for problems in internetworks is high, and the source of problems is often elusive. Thus there is a strong demand for robust diagnostic tools for troubleshooting networking failures.

Currently there are diagnostic tools which correlate multiple protocols on either an access network or a core network portion of a telecommunication network. While such tools are useful in identifying certain network issues, they are nonetheless limited in their diagnostic capabilities since neither one covers the network end to end (e.g., access network to core network).

It is to be appreciated that when a network problem arises, it can be rooted anywhere in the networks: the access, or core network, or in both places. To troubleshoot network issues quickly, it is imperative to have visibility to the entire network at granularity of a session/call.

SUMMARY OF THE INVENTION

The purpose and advantages of the below described and illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, is the ability to correlate the packets on the core network with that on the access network. In one aspect described is a computer implemented method and telecommunications diagnostic apparatus that generates an identification attribute from Information Elements (IEs) in S1AP packets present in the core network and accessible to the access network. The generated identification attribute is integrated to an access and core session of the access and core network to correlate data packets between the access and core session by comparing if a core session contains the same identification attribute as that of an access session and if there is any time overlap of the two sessions.

In further, optional aspects, described is a method and telecommunications diagnostic apparatus for performance management for processing an access session in a cellular mobile packet data network having a plurality of mobile stations linked to a plurality of base stations (eNodeBs) through a plurality of radio channels. The base stations (eNodeBs) are linked to MME and SGW nodes in a packet core network. Signaling packets on Uu and X2 interfaces in the access network and S1AP packets on S1-MME interfaces in the core network are processed via a Trace Port input of the access network. Correlated are signaling packets on Uu and X2 interfaces in the access network, with S1AP packets on an S1-MME interface in the core network, via utilizing unique correlation IDs provided by Trace Port functions on the eNodeBs wherein signaling packets on the Uu and X2 interfaces, and the S1AP packets, carry a correlation ID. An access session is created when a signaling packet with a new correlation ID is detected. And when a S1AP packet is detected with the same correlation ID, message type is processed to determine if it contains Information Elements (IEs) eNB-ID, MME-UE-ID and eNB-UE-ID so as to extract the IEs. An identification attribute eNodeBCallID is generated from the extracted IEs and the generated eNodeBCallID identification attribute is integrated in the access session that has the same correlation ID as the S1AP packet. In summary it is to be appreciated that in telecommunication networks, a mobile user session involves an access network and a core network. Concerning network troubleshooting, it is advantageous to be able to inspect all the signaling packets involved in a session across both an access network and a core network. The present invention provides a tool and method for correlating access and core network sessions so as to provide a user with visibility of related packets across the entire network. Additionally, by correlating a core session and its corresponding access session, a user can find an access session by identification attributes only a core session possesses.

BRIEF DESCRIPTION OF THE DRAWINGS

The accompanying appendices and/or drawings illustrate various non-limiting example, inventive aspects in accordance with the present disclosure.

DETAILED DESCRIPTION OF CERTAIN EMBODIMENTS

Figure 1:
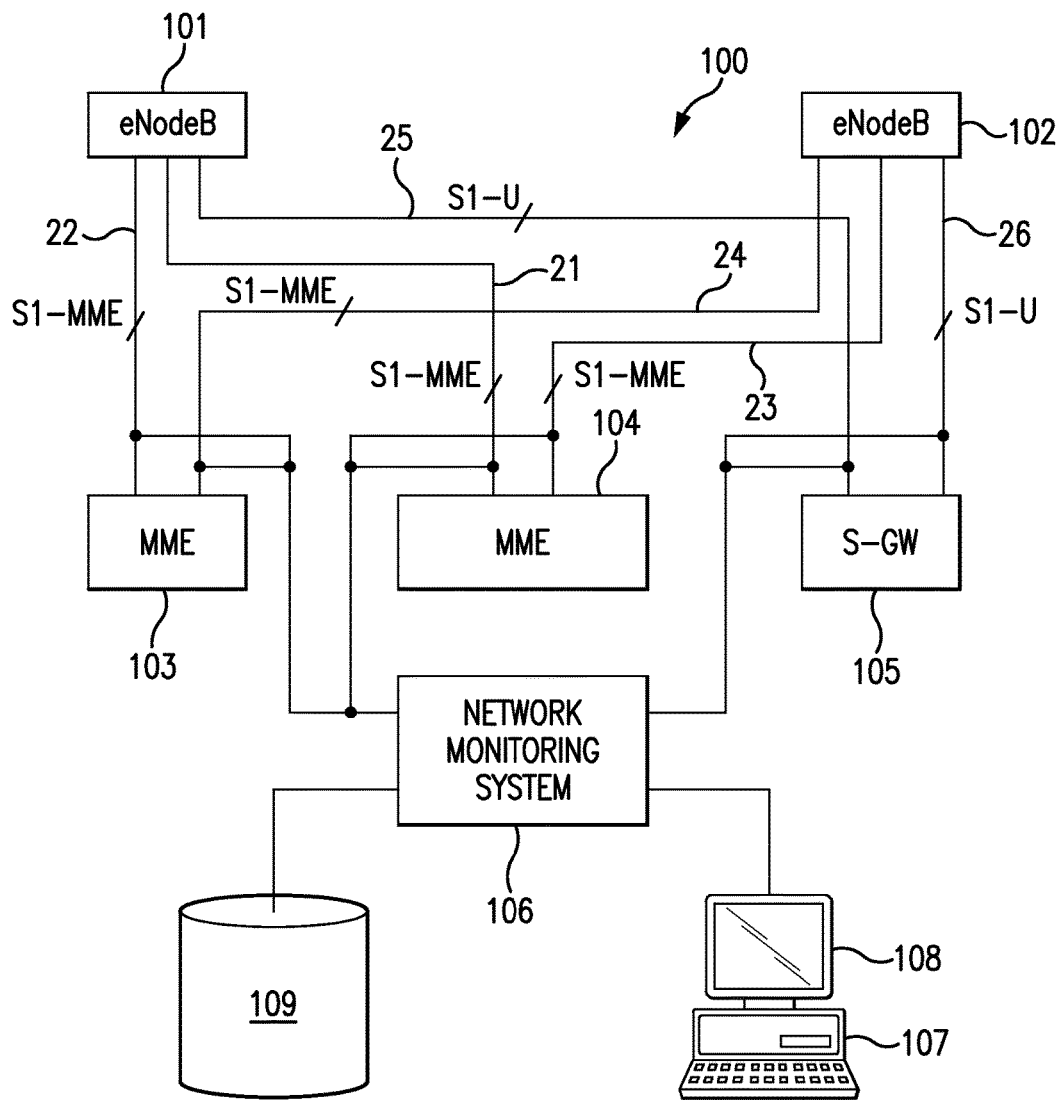
FIG. 1 illustrates a high level schematic diagram of an LTE network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary high level schematic diagram of LTE/SAE network 100 depicting a Network Monitoring System in which below illustrated embodiments of the present invention for correlating protocols across access and core networks may be implemented.

In a LTE/SAE network 100, the S1 interface is an interface between an evolved Universal Terrestrial Radio Access Network (eUTRAN) and core network nodes. The S1 interface consists of a control plane interface (S1-MME) and a user plane interface (S1-U). In exemplary network 100, eNodeBs 101 and 102 in the eUTRAN are coupled to MMEs 103 and 104 in the core network by S1-MME interfaces 21-24.

MMEs 103 and 104 are the signaling nodes interfacing the eNodeBs on one side and the rest of the packet core network on the other side. The core network is designated as an Evolved Packet Core (EPC) in LTE/SAE. The MMEs are responsible for Non-Access Stratum (NAS) signaling to the user equipment (UE), for mobility handling either inter-MME or inter-RAT (inter-Radio Access Technologies, e.g. UTRAN/GERAN), for initiating paging and authentication of user equipment (UE), for establishing the traffic bearers on the S1 side and on the EPC side as well. The MMEs maintain location information as the list of Tracking Areas where each user can be located. Multiple MMEs can be grouped together in an MME pool to meet the signaling load in the network.

The eNodeBs are enhanced NodeBs that provide the air interface and perform radio resource management in LTE/SAE network 100. Each eNodeB may be coupled to multiple MMEs. Similarly, each MME may be coupled to multiple eNodeBs. Stream Control Transmission Protocol (SCTP) is the transport layer protocol for S1 interface control plane signaling on S1-MME interfaces 21-24. Between a specific pair of eNodeB-MME nodes, there will be only one SCTP association, even if there are multiple IP addresses at either or both nodes. An SCTP Association Identifier identifies the SCTP association between the two nodes. This parameter can be used to globally identify a specific SCTP association. Embodiments of the present invention correlated each SCTP association to the specific MME and eNodeB nodes to which it refers. An exemplary process for correlating SCTP associations to interconnected network nodes is disclosed in U.S. Patent Application Publication No. US 2009/0129267 A1, assigned application Ser. No. 12/096,556, and titled "System and Method for Discovering SCTP Associations in a Network," the disclosure of which is incorporated by reference herein in its entirety.

Messages exchanged on the control plane interface (S1-MME) are used, for example, to set up calls for the UE. Once the calls are set up, user plane packets are sent from eNodeBs 101 and 102 over the user plane interfaces (S1-U) 25-26 to Serving Gateway (S-GW) 105, which routes and forwards the packets.

During network access, the serving MME allocates a Globally Unique Temporary Identity (GUTI) to the UE. The use of the GUTI avoids the exchange of a UE's permanent identity (International Mobile Subscriber Identity—IMSI) over the radio access link. The GUTI consists of two components: a Globally Unique MME Identity (GUMMEI) and an MME Temporary Mobile Subscriber Identity (M-TMSI). The GUMMEI is the identity of the MME that has allocated the GUTI. The M-TMSI is the identity of the UE within that MME.

The GUMMEI consists of the Public Land Mobile Network (PLMN) Identifier and the MME Identifier (MMEI). The PLMN Identifier consists of the Mobile Country Code (MCC) and Mobile Network Code (MNC). The MMEI consists of the MME Group Identifier (MMEGI) and the MME Code (MMEC). The MMEC provides a unique identity to an MME within the MME pool, while the MMEGI is used to distinguish between different MME pools within the network.

Geographical areas served by the MME pool are designated as Tracking Areas (TA). UEs are located within the TAs, which may be served by one or more MMEs in the pool. The 3GPP specifications define an MME pool area as an area within which a UE may be served without having to change the serving MME. An MME pool area is served by one or more MMEs (i.e. a pool of MMEs) in parallel. The MME pool areas are a collection of complete Tracking Areas, and the MME pool areas may overlap each other. The network operator must ensure that the MMEC is unique within the MME pool area and, if overlapping pool areas are used, the MMEC must be unique within the area of overlapping MME pools.

Based upon these requirements, it is possible to build a relation between MME pool areas and tracking areas. The following conclusions can be drawn: The MMEC code is unique per MME pool area; the MMEC code is unique within areas of overlapping MME pools; and an MME pool area is a collection of complete TAs. Accordingly, a specific MMEC code is unique per TA. Two MME nodes cannot have the same MMEC code serving the same TA.

Individual eNodeBs may be designated with a name or other identifier (eNB NAME). Additionally, a global identifier is assigned to each eNodeB (eNB Global ID), which contains the PLMN identity and the eNodeB identity used within the PLMN. An eNodeB can serve one or more cells, each one identified by an eUTRAN Cell Global Identifier (eUTRAN CGI). The eUTRAN CGI contains the PLMN identity and a cell identity.

TABLE 1 is a list of parameters that are useful for auto-discovery of MME and eNodeB topology. TABLE 1 also explains the relationship between the different identifiers. For example, both GUTI and GUMMEI include the global MME identifier (MMEGI-MMEC), and the S-TMSI includes the MMEC identifier, but not the MMEGI.

TABLE 1

| Parameter name | Description |
| --- | --- |
| MME Pool | A set of MMEs that can share the load of a number of eNodeBs. The MME pool covers a complete number of tracking areas. |
| MMEGI | MME Group ID<br>Identifies a MME pool globally in the network. |
| MMEC | MME Code<br>Identifies a specific MME in the pool. |
| GUMMEI | Globally Unique MME Identifier = MCC + MNC + MMEGI + MMEC<br>Identifier of the MME that is globally unique in all the LTE/SAE mobile networks.<br>MCC = Mobile Country Code<br>MNC = Mobile Network Code |
| GUTI | Globally Unique Temporary Identity = GUMMEI + M-TMSI<br>Globally Unique Identifier allocated by an MME to a UE. |
| S-TMSI | S-Temporary Mobile Subscriber Identity = MMEC + M-TMSI<br>Shortened form of GUTI that is unique only within a certain MME. |
| TAC | Tracking Area Code<br>Code identifying a geographical area where the UE can be located. |
| TAI | Tracking Area Identity<br>Identity of the tracking area in the form: MCC + MNC + TAC |
| eNB NAME | Optional identifier that can be assigned to an eNodeB. |
| eNB Global ID | eNodeB Global Identifier = PLMN identity + eNodeB identity<br>Global identifier of the eNodeB.<br>The eNodeB identity is 20 bits long if a "Macro eNodeB" or 28 bits long if a "Home eNodeB."<br>The Macro eNodeB is handling normal cells, while the Home eNodeB is a Femto cell itself. |
| e-UTRAN CGI | e-UTRAN Cell Global Identifier = PLMN identity + Cell Identity<br>The 20 left-most bits of the "Cell Identity" are the "eNodeB identity" in case of normal Macro eNodeB.<br>The entire "Cell Identity" (28 bits) is the "eNodeB identity" in case of Home eNodeB. |

Network monitoring system 106 may be used to monitor the performance of network 100. Monitoring system 106 captures packets that are transported across interfaces 21-26 and any other network links or connections. In one embodiment, packet capture devices are non-intrusively coupled to network links 21-26 to capture substantially all of the packets transmitted across the links. Although only links 21-26 are shown in FIG. 1, it will be understood that in an actual network there may be dozens or hundreds or more of physical, logical or virtual connections and links between network nodes. In one embodiment, network monitoring system 106 is coupled to all or a high percentage of these links. In other embodiments, network monitoring system 106 may be coupled only to a portion of network 100, such as only to links associated with a particular service provider. The packet capture devices may be part of network monitoring system 106, such as a line interface card, or may be separate components that are remotely coupled to network monitoring system 106 from different locations.

Monitoring system 106 preferably comprises one or more processors running one or more software applications that collect, correlate and analyze media and signaling data packets from network 100. Monitoring system 106 may incorporate protocol analyzer, session analyzer, and/or traffic analyzer functionality that provides OSI (Open Systems Interconnection) Layer 2 to Layer 7 troubleshooting by characterizing the traffic by links, nodes, applications and servers on network 100. Such functionality is provided, for example, by the Iris Session Analyzer toolset available from Tektronix®, Communications. In brief, ISA is a network diagnostic tool configured and adapted for generally troubleshooting complex issues on telecommunications networks. ISA provides diagnostic real-time and historical views of problems occurring on a telecommunications networks. It may provide multi-protocol and cross-domain support providing visibility into complex call paths in a telecommunications network.

The packet capture devices coupling network monitoring system 106 to links 21-26 may be high-speed, high-density 10GE probes that are optimized to handle high bandwidth IP traffic, such as the GeoProbe G10 available from Tektronix Communications. A service provider or network operator may access data from monitoring system 106 via user interface station 107 having a display or graphical user interface 108, such as the IrisView configurable software framework that provides a single, integrated platform for all applications, including feeds to customer experience management systems and operation support system (OSS) and business support system (BSS) applications, which is also available from Tektronix Communications. Monitoring system 106 may further comprise internal or external memory 109 for storing captured data packets, user session data, call records and configuration information. Monitoring system 106 may capture and correlate the packets associated specific data sessions on links 21-26. In one embodiment, related packets can be correlated and combined into a record for a particular flow, session or call on network 100.

Network 100 is continually evolving as additional eNodeBs and MMEs are added to the network system and as new interconnections are created either between new network elements or between new and existing network elements. To properly analyze the operation of network 100, monitoring system 106 needs to know the topology of the network, including the existence and identify of all network nodes, such as eNodeBs and MMEs, and the interconnections among the network nodes. In a preferred embodiment of the invention, monitoring network 106 detects the presence of eNodeBs and MMEs and the associated S1-MME interfaces.

The S1-MME interfaces carry S1AP messages including SCTP TA (transport address) pairs and, for specific messages, the Transport Layer Address (TLA) either of the eNodeB or the S-GW to be used on the S1-U interface. The messages monitored over the S1-MME interfaces may be used by monitoring system 106 for auto-discovery of the MME nodes. The S1 Application Protocol (S1-AP) is used to set up UE-associated logical S1 connections between an eNodeB and an MME. The S1-AP protocol is used to manage such connections and also to send UE-related NAS messages over the S1-MME interface. Other important features of S1-AP concern the support of mobility, the management of the eNodeB-MME connection and the management of RABs (Radio Access Bearers), with all the messages that concern their creation, modification and release.

Figure 2:
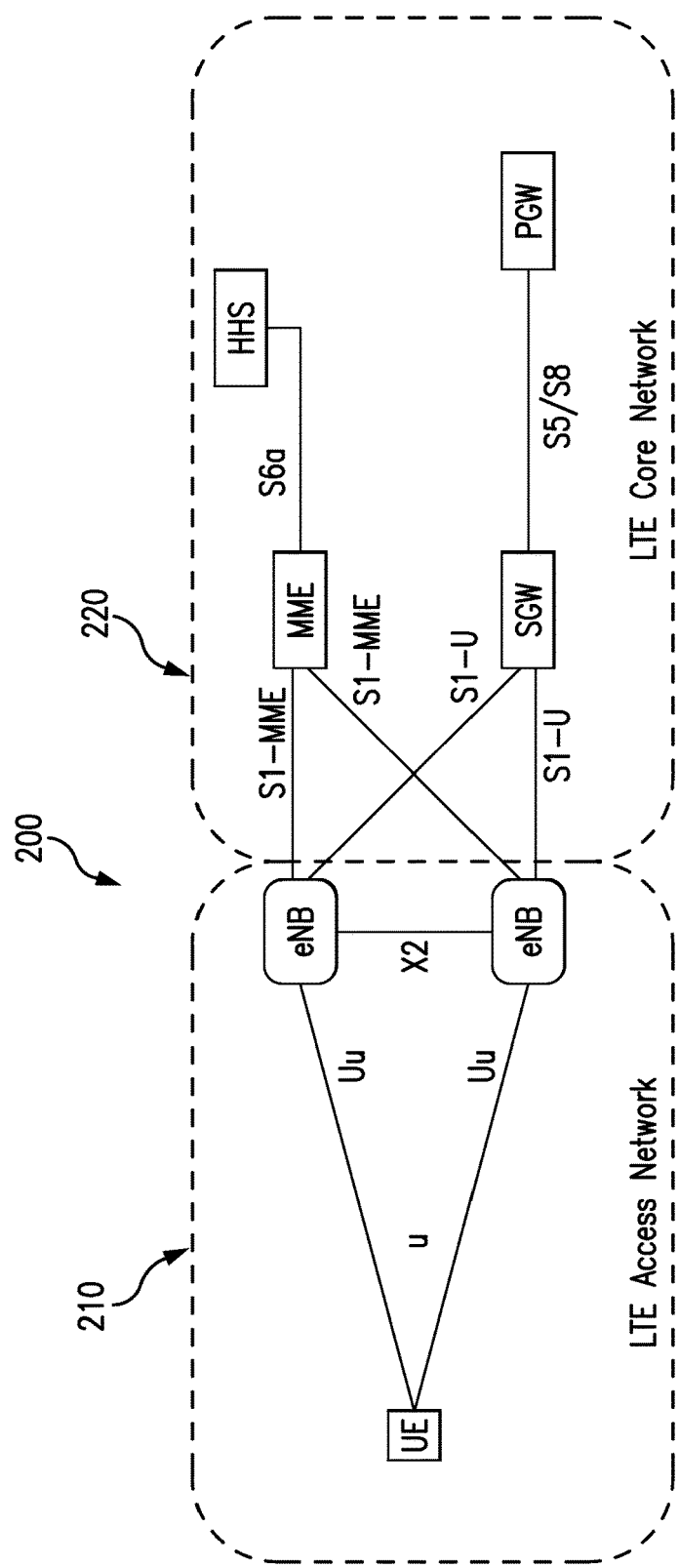
FIG. 2 illustrates a simplified high level schematic diagram of an access and core network portion of LTE network.
Figure 3:
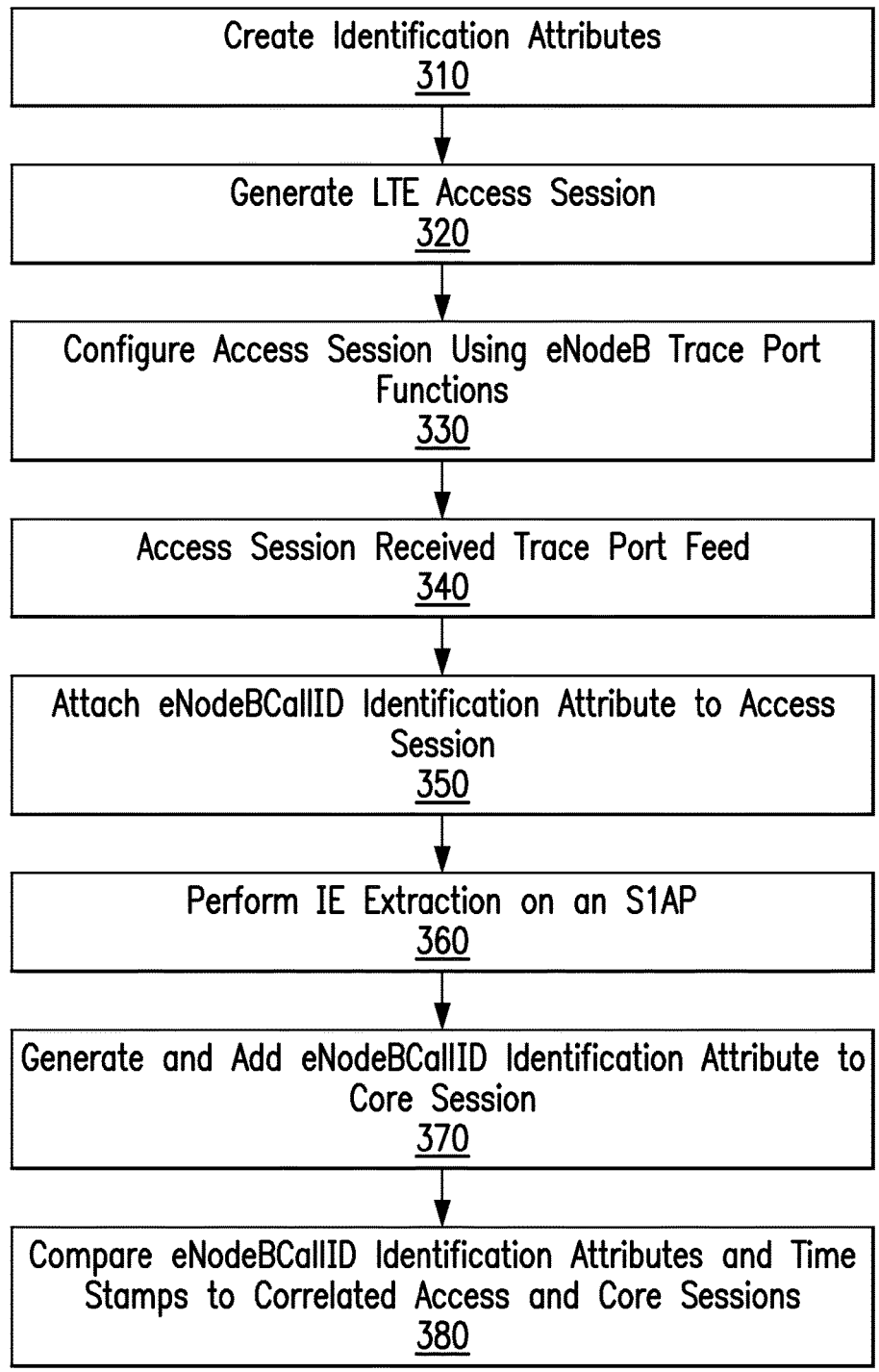
FIG. 3 illustrates a method of operation of the network of FIG. 2.

With the exemplary LTE network 100 having Monitoring system 106 of FIG. 1 being generally shown and discussed above, discussion will now turn to an illustrated embodiment of the present invention, in for provided for illustrative and reference purposes, FIG. 2 illustrates a simplified system overview of an LTE telecommunications network 200 (derived from that of network 100) having an access network 210 and a core network 220, wherein the telecommunications network 200 is shown is preferably a Long Term Evolution (LTE) network from that shown and described above with reference to FIG. 1 (which the present invention is not to be understood to be limited thereto). In conjunction to FIG. 2, reference is also made to FIG. 3 illustrating a method of operation for the system of FIG. 2 in accordance with an embodiment of the invention. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

It is to be appreciated existing network troubleshooting diagnostic monitoring systems 106 correlate multiple protocol packets on a core network into a core session and monitor Uu and X2 interfaces on an access network and correlates multiple protocols into a separate access session simultaneously. It is noted the access network session does not typically provide information which can be utilized to correlate with the corresponding core network. As described below, an embodiment of the present invention provides an access-core correlation tool and method operative to correlate the core and access session in a LTE network, and therefore provide a powerful troubleshooting diagnostics with visibility to the related packets across the entire LTE network (e.g., access and core network).

It is to be appreciated both the access and core network have access to S1AP packets on a S1 interface notwithstanding only a core session typically tracks S1AP packets because S1 interface is in the core network. In accordance with an illustrated embodiment of the present invention, an identification attribute eNodeBCallID preferably consisting of three Information Elements (IEs) from S1AP packets is created and added to both a core and access session to correlate the access and core sessions (step 310).

It is to be further appreciated an LTE access session is typically generated by monitoring Uu and X2 interfaces, if existing (step 320). The access session typically has little information which can be utilized to directly correlate with a corresponding core session. This is typically because the signaling layer of Uu interface does not carry such information and the payload of signaling packets on the Uu interfaces are zeroed out in many regions of world due to statutory requirements. Additionally, the X2 interface is typically an optional interface in deployment, thus it may not exist. Further, signaling packet handoff may not occur during the session. Thus, the signaling packets on the Uu and X2 interfaces may not contain enough information to allow correlation between access and core network sessions. It is to be understand that in accordance with an embodiment of the present invention, access and core sessions are correlated by utilizing information extracted from S1AP packets which both the access and core network have access to.

In accordance with an illustrated embodiment, an access session is built by the monitoring system from eNodeB Trace Port feed generated by eNodeB Trace Port functions preferably defined by 3GPP (step 330). Trace Port functions monitor Uu, X2, and S1 interfaces and correlates signaling packets. An access session receives a feed from a Trace Port to process the signaling packets (step 340). It is noted that even though an access session tracks packets on Uu and X2 interfaces, certain S1AP packets are processed to extract eNB-ID, MME-UE-ID, and eNB-UE-ID IEs to build an identification attribute eNodeBCallID. The eNodeBCallID identification attribute is then attached to the access session for correlation with the core session (step 350). The IE extraction is preferably performed once for a session, on one S1AP packet, which has all three IEs (step 360). Afterwards, S1AP packets are no longer preferably processed and S1AP packets are preferably dropped.

To put otherwise, an S1 interface is preferably part of the core network whereby while the core session processes S1AP packets on a S1 interface, it also extracts eNB-ID, MME-UE-ID, and eNB-UE-ID IEs to build an eNodeBCallID identification attribute from a S1AP packet which has all three IEs. And once generated, the eNodeBCallID identification attribute is added to the core session for correlation with the access session (step 370). It is to be appreciated that the eNB-ID is globally unique in an operator's network, MME-UE-ID is a UE ID assigned by a MME and unique within that MME at time the core session exists. The eNB-UE-ID is an UE ID assigned by a eNodeB and unique during the time period the corresponding core session exists and communicating with the user equipment through this eNodeB. Since both the access and core network have access to the same S1AP packets, both the access and core sessions have the same eNodeBCallID identification attribute. Therefore by comparing the eNodeBCallID identification attributes and time stamps with one another, the access and core sessions can be robustly correlated (step 380).

The aforesaid eNodeBCallID identification attribute preferably consists of three information elements (IEs), preferably defined as:

| Byte 9 | Byte 8 | Byte 7 | Byte 6 | Byte 5 | Byte 4 | Byte 3 | Byte 2 | Byte 1 | Byte 0 |
|---|---|---|---|---|---|---|---|---|---|
| 0x0 | eNB-ID | | | MME-UE-ID | | | eNB-UE-ID | | |

It is to be understood that while monitoring the telecommunications network, the packets on the Uu, X2 interfaces, and the S1AP packets, are preferably processed from the feed of a Trace Port. The Trace Port functions to correlate all signaling packets on the Uu, X2, and S1 interfaces while adding a unique identification ID on each packet for each session. Thus, when a signaling packet with a new id is detected, an access session is created so that when a S1AP packet is detected, the message type is checked and if it contains all three IEs (e.g., eNB-ID, MME-UE-ID, and eNB-UE-ID), the IEs are extracted and the eNodeBCallID identification attribute is generated and added to the session which has the same ID as the S1AP packet. Afterwards, S1AP packets are no longer processed for the session and the session no longer tracks S1AP packets which are then subsequently dropped. The S1AP message which has the aforesaid three IEs (e.g., eNB-ID, MME-UE-ID, and eNB-UE-ID) preferably has type of HandoverNotify, PathSwitchRequest, UplinkNASTransport, InitialUEMessage, CellTrafficTrace.

It is also to be appreciated that on the core network side, when processing a S1AP packet, if it has all three IEs (e.g., eNB-ID, MME-UE-ID, and eNB-UE-ID), the eNodeBCallID identification attribute is generated and is added to the session. When handover occurs, a core session may have multiple eNodeBCallIDs identification attributes. The access and core sessions are correlated by comparing if a core session contains the same eNodeBCallID identification attributes as that of an access session and if there is any time overlap for the access and core session.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method for correlating data packets across a core and access network in a telecommunications network by a network monitoring device having a protocol analyzer coupled to the network, comprising:

correlating signaling packets from Uu and X2 interfaces in the access network and S1AP packets on an S1-MME interface in the core network via utilizing unique correlation IDs provided by Trace Port functions on the eNodeBs wherein signaling packets on the Uu and X2 interfaces, and the S1AP packets for a session, carry a same correlation ID;

creating an access session when a signaling packet with a new correlation ID is detected, and when a S1AP packet is detected, message type is processed to determine if it contains Information Elements (IEs) eNB-ID, MME-UE-ID and eNB-UE-ID so as to extract the IEs wherein IE extraction is performed once for an access session on one S1AP packet such that after IE extraction, no S1AP packets are further processed and all S1AP packets are dropped for an access session;

processing the S1AP packet to extract the IEs and generating an identification attribute eNodeBCallID from the extracted IEs;

integrating the generated eNodeBCallID identification attribute to the access session that has the same correlation ID as the S1AP packet;

generating the identification attribute eNodeBCallID from Information Elements (IEs) in S1AP packets present in the core network when processing a core session, in response to determining that the processed S1AP packet contains each of the eNB-ID, the MME-UE-ID and the eNB-UE-ID IEs wherein the identification attribute is formatted as an eNodeBCallID identification attribute;

integrating the generated identification attribute to the core session of the core network such that both the access and the core sessions have the same eNodeBCallID identification attribute; and correlating data packets between the access and core session by comparing if a core session contains the same identification attribute as that of an access session and if there is time overlap of the two sessions, wherein access and core sessions are correlated by comparing generated eNodeBCallID identification attribute and corresponding time stamps.

2. A computer implemented method as recited in claim 1 wherein the telecommunications network is a Long Term Evolution (LTE) network.

3. A computer implemented method as recited in claim 1 wherein the IEs eNB-ID, MME-UE-ID, and eNB-UE-ID are the extracted IEs from S1AP packets.

4. A computer implemented method as recited in claim 1 further including the step of tapping into the access network through a Trace Port input.

5. A method for performance management of processing an access session in a cellular mobile packet data network having a plurality of mobile stations linked to a plurality of base stations (eNodeBs) through a plurality of radio channels by a network monitoring device having a protocol analyzer coupled to the network, the base stations (eNodeBs) being linked to MME and SGW nodes in a packet core network comprising the steps of:

processing S1AP packets from S1-MME interfaces in the core network via a Trace Port input of the access network;

correlating signaling packets from Uu and X2 interfaces in the access network and S1AP packets on an S1-MME interface in the core network via utilizing unique correlation IDs provided by Trace Port functions on the eNodeBs wherein signaling packets on the Uu and X2 interfaces, and the S1AP packets, carry a correlation ID;

creating an access session when a signaling packet with a new correlation ID is detected; and when a S1AP packet is detected, message type is processed to determine if it contains Information Elements (IEs) eNB-ID, MME-UE-ID and eNB-UE-ID so as to extract the IEs wherein IE extraction is performed once for an access session on one S1AP packet such that after IE extraction, no S1AP packets are further processed and all S1AP packets are dropped for an access session;

processing the detected S1AP packet to extract the IEs and generating an identification attribute eNodeBCallID from the extracted IEs, in response to determining that the processed S1AP packet in the core network contains each of the eNB-ID, the MME-UE-ID and the eNB-UE-ID IEs, when processing a core session wherein the identification attribute is formatted as an eNodeBCallID identification attribute; and integrating the generated eNodeBCallID identification attribute to the access session that has the same correlation ID as the S1AP packet such that both the access and the core sessions have the same eNodeBCallID identification attribute, wherein access and core sessions are correlated by comparing generated eNodeB-CallID identification attribute and corresponding time stamps.

* * * * *